United States Patent [19]

Ihm et al.

[11] Patent Number: 5,441,590
[45] Date of Patent: Aug. 15, 1995

[54] METHOD FOR THE PREPARATION OF PREPREG OF THERMOPLASTIC COMPOSITE RESIN

[75] Inventors: Dae W. Ihm; Soon S. Kim, both of Seoul; Hee S. Ihm; Iee K. Kim, both of Kyunggi-do; Seon H. Cho, Seoul, all of Rep. of Korea

[73] Assignee: Cheil Synthetics Incorporation, Kyongsangbuk-do, Rep. of Korea

[21] Appl. No.: 241,568

[22] Filed: May 12, 1994

[30] Foreign Application Priority Data

Dec. 10, 1993 [KR] Rep. of Korea ............... 93-27249

[51] Int. Cl.⁶ ............................................. B32B 17/10
[52] U.S. Cl. ................................. 156/148; 156/172; 156/308.2; 428/284; 428/285; 428/286
[58] Field of Search ............... 428/284, 285, 286, 296, 428/300, 110; 156/148, 172, 308.2

[56] References Cited

U.S. PATENT DOCUMENTS 4,863,790  8/1989  Horacek et al. ............... 428/300
5,312,669  5/1994  Bedard ............................ 428/284

Primary Examiner—Michael W. Ball
Assistant Examiner—Sam Chuan Yao
Attorney, Agent, or Firm—Harrison & Egbert

[57] ABSTRACT

A method for the preparation of prepreg of thermoplastic composite resin is disclosed. The method comprises the steps of: laminating a non-oriented glass fibrous mat experiencing needle punching on a base layer of a polypropylene film; forming a complex layer which comprises a plurality of yarns unidirectionally oriented on the both sides of a polypropylene film on the non-oriented glass fibrous mat atop the base layer; overlying a needled, non-oriented glass fibrous mat on the complex layer of the unidirectionally oriented glass fibrous yarn-/polypropylene film/unidirectionally oriented glass fibrous yarn; covering a top layer of a polypropylene film over the needled, non-oriented glass fibrous mat, to form a laminate; and pressing the laminate at high temperatures under high pressures. By virtue of employing the unidirectionally oriented glass fibrous yarns which can be satisfactorily impregnated into the polypropylene resin, the prepreg of thermoplastic composite resin is superior in mechanical strength, thermal resistance and fluidity. Thermoplastic composite material containing unidirectionally oriented glass fibers with no damage can be used as substance requiring high strength, such as construction materials, machine elements and etc and as articles requiring compress molding, such as auto parts, especially bumper beam.

5 Claims, 2 Drawing Sheets

METHOD FOR THE PREPARATION OF PREPREG OF THERMOPLASTIC COMPOSITE RESIN

BACKGROUND OF THE INVENTION

1. Field of the invention

The present invention relates, in general, to a method of the preparation of a sheet of thermoplastic composite material composition and, more particularly, to a method for preparing prepregs of thermoplastic composite resin, using a strand of or a mat of glass fibrous reinforcement, capable of providing reusability, excellent mechanical strength, superior thermal resistance and superior impregnation property to the prepregs.

2. Description of the Prior Art

Generally, fiber-reinforced plastics have employed reinforcing materials made of staples resulting from glass fibers. However, the fiber-reinforced plastics are difficult to manufacture, for example, glass fibrous strands used in the plastics are often cut in a compounding process or an injection molding process, which leads to the degradation phenomenon of impact strength in final products, and thus, the final products are not suitable to applications requiring high impact strength. In addition, when the resinous material for the fiber-reinforced plastics is injected, the injected product is poor in dimensional stability due to the orientation of the glass fibers contained the resinous material. Meanwhile, a thermosetting composite resin shows excellent thermal resistance, but typically accompanies reduction in productivity because of the requirement of its curing time and is problematic in impact resistance.

Research and development efforts have been directed to the improvement of the final molded product in mechanical strength as well as lightness. As a result of groping for useful methods for molding the fiber-reinforced thermoplastic composite resin, a stamping process has been developed which comprises heating a sheet of prepreg above melting temperature of the resin employed in the composite material, to make the sheet-like thermoplastic composite material have fluidity, subjecting the fluidized composite material to compression molding in a heated mould, and cooling the composite resin in the mould to produce a product, which is useful for a plurality of purposes, such as auto parts, sheetings for construction or civil engineering, etc.

Because when a sheet of thermoplastic composite resin comprising a non-oriented, glass fibrous mat is molded, it is required to fill the prepreg thereof in a mould, it is general to needle-punch the non-oriented, glass fibrous mat to allow the mat to be fluidizable. However, the use of both the thermoplastic resin and the needled, non-oriented fibrous mat improves mechanical properties but results in inferior surface properties. In particular, there is a problem that when a molded product made therefrom is unable to be used as an applications which is applied with only unidirectional forces due to its lack of physical properties.

Determined as the properties of the composite material are according to the shape of the glass fibrous mat, the content ratio of the glass fiber to the resin, the distribution of the glass fiber in the resin, the coagulation state between the glass fibers and the resin and the like, the degree of the impregnation of the fibrous mat in the substrate is of great importance, because poor impregnation causes void volumes which detrimentally affect the physical properties thereof.

Such a sheet of thermoplastic composite resin prepreg is disclosed in many prior arts, for example, U.S. Pat. Nos. 3,664,909, 3,684,645, 3,849,148 and 3,883,333, which also say preparation methods along with a variety of specific processings therefor. Thermoplastic composite materials with superior impact resistance and rigidity can be produced by the conventional methods. However, with regard to the impregnation of the glass fiber into resin, it is insufficient in the conventional thermoplastic composite materials produced. Further, the prior art thermoplastic composite materials have poor fluidities in molding.

In order to enhance the impregnation of glass fiber into resin, there is suggested the use of high fluidity polypropylene in EP. No. 211,249. The resulting composite material employing the high fluidity polypropylene, however, is unsatisfactory in surface properties. Besides, when compress-molding the prepreg of thermoplastic composite material into a complicate shape, the complicate shape effects poor fluidity in a final product in spite of the original high fluidity, leading to the decline of reinforcing effect.

SUMMARY OF THE INVENTION

Therefore, an object of the present invention is to overcome the above problems encountered in prior arts and to provide a method for the preparation of prepregs of thermoplastic composite resin, capable of imparting superior mechanical physical properties, such as tensile strength and impact strength, as well as improvement in fluidity.

In accordance with the present invention, the above object can be accomplished by providing a method for the preparation of prepregs of thermoplastic composite resin, comprising the steps of: laminating a first, non-oriented glass fibrous mat on a base layer of a first polypropylene film, said first non-oriented glass fibrous mat experiencing needle punching; forming a complex layer on the first non-oriented glass fibrous mat atop the base layer, said complex layer comprising a plurality of yarns which are unidirectionally oriented on the both sides of a second polypropylene film by winding them around the film with the tensile strength of the yarns uniform; overlying a second, non-oriented glass fibrous mat on the complex layer of the unidirectionally oriented glass fibrous yarn/polypropylene film/unidirectionally oriented glass fibrous yarn, said second non-oriented glass fibrous mat being needle-punched; and covering a top layer of a third polypropylene film over the second, second non-oriented glass fibrous mat, to form a laminate; and pressing the laminate at high temperatures under high pressures.

The present invention is characterized by employing the glass fibers which are unidirectionally oriented by an apparatus according to the present invention.

BRIEF DESCRIPTION OF THE DRAWING

Other objects and aspects of the invention will become apparent from the following description of embodiments with reference to the accompanying drawing in which.

DETAILED DESCRIPTION OF THE INVENTION

Figure 2:
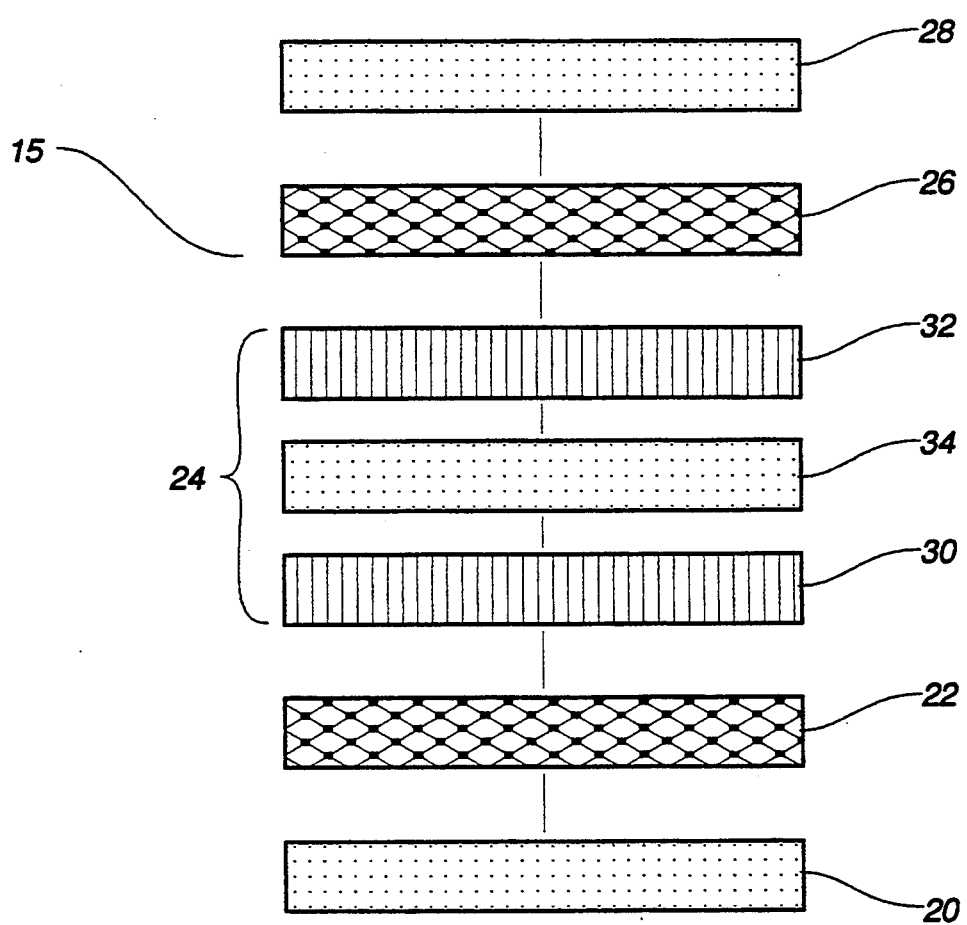
FIG. 2 is an exploded cross-sectional view of the layers of the composite material.

A prepreg of thermoplastic composite resin according to the present invention is prepared from a laminate 15 (shown in exploded fashion in FIG. 2) comprising polypropylene films and glass fibers. The laminate 15 is structured to have five stories wherein a base layer 20 of polypropylene film, a second layer 22 of a non-oriented glass fibrous mat, a third layer 24 of glass fibrous yarns and a polypropylene film, a fourth layer 26 of a non-oriented glass fibrous mat and a fifth layer 28 of a polypropylene film are stacked, in due order.

Polypropylene resins used in the present invention are those that have melt indexes ranging from about 20 to about 40 g/10 min. when measured at 230° C. and under a load of 2.16 kg according to the standard of ASTM D1238. In accordance with the present invention, the polypropylene film has a thickness of about 100 to about 200 μm and is used in an amount of about 50 to about 70% by weight, based on the total weight of the thermoplastic composite resin. In order to improve the adhesion of polypropylene to the fiber glass, the polypropylene is modified with maleic acid or acrylic acid.

In advance of being applied, the non-oriented glass fibrous mat is treated with needles. That is, a plurality of needles are pushed through the mat and then pulled out to intertwine numerous strands of glass fiber, provide strength to the mat and impart fluidity to the mat. This needle punching is carried out in the number of about 5 to about 40 per square centimeter of the mat and preferably about 10 to 20/cm$^2$, to prevent the glass fiber from being cut and thus to avert the degradation of impact resistance.

Monofilaments, form of the glass fibers used in the mat, are on the order of from about 15 to about 25 μm in diameter, and preferably about 17 to about 23 μm, and their surfaces are treated with organosilane compounds. The thermoplastic composite resin according to the present invention contains the glass fibrous mat present at a level of from about 10 to about 30% by weight based on the entire weight of the composite resin, and preferably from about 15 to about 20% by weight.

The third layer 24 in the laminate according to the present invention is formed from yarns 30 and 32 of glass fiber and a polypropylene film 34. A plurality of yarns of glass fiber are wound around a polypropylene film 34 with the glass fiber oriented unidirectionally. As a result, a skein of yarns in which the yarns are neatly arranged is formed. The neat arrangement of the glass fibrous yarns 30 and 32 and the impartation of unidirectional orientation both can be accomplished with the apparatus according to the present invention.

Figure 1:
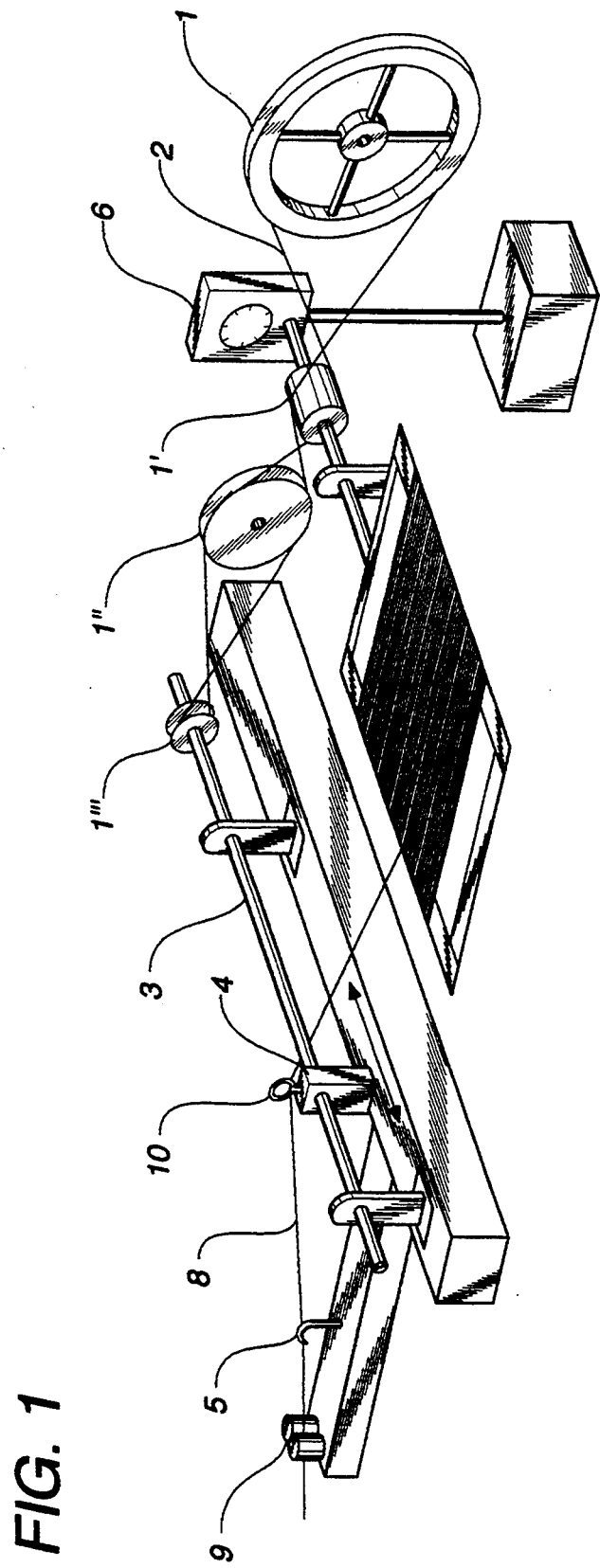
FIG. 1 is a schematic, prospective view showing an apparatus for arranging yarns of glass fiber unidirectionally, according to the present invention.

Referring now to FIG. 1, there is illustrated the procedures for the unidirectional orientation of glass fibers and the neat arrangement of the glass fibrous yarns. As shown in FIG. 1, a driving pulley 1 is rotated, which in turn makes a second pulley 1', a third pulley 1'' and a fourth pulley 1''' revolve at their respective, predetermined rotating speeds according to predetermined rotating ratios. If the fourth pulley 1''', when the second pulley 1' makes one revolution, is rotated at a reduction speed ratio of N, a screw shaft 3 makes as many as n revolutions on its axis. As the screw shaft 3 rotates, a carrier 4 moves as distance as corresponds to a value of the turn number of the fourth pulley 1''' by the pitch leftward or rightward according to the rotational direction thereof. Since a bracket 7 is, as shown in this figure, connected with the second pulley 1', it is controlled by the turn number of the fourth pulley 1''' and the value of rotating ratio by the pitch.

When a yarn of glass fiber 8 is wound around the bracket 7, there is generated a reduction speed due to the friction with a fiber tension unit 9, causing a tensile strength in the yarn. As a result, the yarn of glass fiber is wound around the bracket with a uniform tensile strength through fiber guiders 5 and 10. The winding number of the glass fibrous yarn around the bracket can be adjusted by varying the radius of the fourth pulley 1'''.

In accordance with the present invention, the prepreg of thermoplastic composite resin is superior in mechanical strength, thermal resistance and fluidity by virtue of employing the unidirectionally oriented glass fibrous yarns which can be satisfactorily impregnated into the polypropylene resin.

With regard to the unidirectionally oriented yarns of glass fiber, their surfaces are treated with organosilane compounds like the monofilaments used in the mat. The yarns of glass fiber are used in an amount of about 10 to about 40% by weight based on the thermoplastic composite resin, and preferably about 20 to about 30% by weight. Monofilaments of the glass fibrous yarn used in the present invention are on an average of from about 10 to about 30 min diameter, and preferably about 20 to about 25 μm. These monofilaments are further characterized by their sizing degrees ranging from about 50 to about 100. Unlike the non-oriented glass fibrous mat, the unidirectionally oriented yarns are not needed to be subjected to the needle punching for the prevention of cutting glass fiber.

The total amount of the glass fiber contained the thermoplastic composite resin according to the present invention is controlled at a level of from about 30 to about 50% by weight based on the entire weight of the thermoplastic composite resin.

As stated above, a sheet of thermoplastic composite material containing unidirectionally oriented glass fibers with no damage according to the present invention is superior in mechanical properties, such as tensile strength and impact strength and thus can be used as parts requiring high strength, such as construction materials, machine elements and etc. In addition, the thermoplastic composite material according to the present invention is improved in fluidity, so that it can be applied to articles requiring compress molding, such as auto parts, especially bumper beam.

In order to better understand the nature of the present invention, a number of examples will now be described.

In the following Examples and Comparative Examples, the physical properties of the thermoplastic composite resin were measured and determined according to the standards stated below.

1. Tensile strength: ASTM D638
2. Impact Strength: ASTM 3256
3. Thermal Distortion Temperature: ASTM 3746
4. Impregnation of Resin: measured using a density measurer
5. Fluidity: after a specimen made of the prepreg of thermoplastic composite material was formed in a size of 10 cm × 10 cm, it was preheated at 200° C. for 20 min. and was subjected compress-molding in a mould with a size of 10 cm × 50 cm at 70° C. under a pressure of 80 bar, and fluidity of the thermoplastic composite resin was calculated by the following formula:

$$\text{fluidity} = \frac{\text{area after molding} - 100}{100} \times 100$$

EXAMPLE 1

Polypropylene resin was modified by grafting maleic acid into polypropylene. This modified polypropylene resin was made a film which was 200 μm thick.

On the modified polypropylene film, there was overlay a non-oriented glass fibrous mat which was used as a reinforcement for a thermoplastic composite resin. The non-oriented glass fibrous mat employed herein weighed 450 g/m² and was needled in the needle punch number of 12/cm². Monofilament of glass fiber used in the non-oriented glass fibrous mat was 22 μm in diameter and had a sizing degree of 350.

Separately, using the apparatus of FIG. 1, a plurality of glass fiber yarns were unidirectionally oriented. In the course of the arrangement, there was inserted a polypropylene film which was 100 μm thick, so as to form a polypropylene film wound in glass fibrous yarns. The unidirectionally oriented, glass fibrous yarn was 20 μm in diameter, had a sizing degree of 50 and amounted to 22% by weight of the prepreg of the thermoplastic composite resin. This polypropylene film wound in glass fibrous yarns was put on the non-oriented glass fibrous mat.

On the resulting structure, another non-oriented, glass fibrous mat and another modified polypropylene film were laminated, in due order, to give a five-story laminate.

The laminate contains the non-oriented, glass fibrous mats and the glass fibrous yarns present at a level of 20% and 22% by weight, respectively, based on the entire weight of the laminate.

Using a double press belt, the laminate was pressed at 210° C. under a pressure of 30 psi, and cooled, to prepare a sheet of prepreg of thermoplastic composite resin which was 3.7 mm thick.

The physical properties of the prepreg prepared are given as shown in the following Table 1.

EXAMPLE 2

A prepreg was prepared in a manner similar to that of Example 1, except that the reinforcements of non-oriented, glass fibrous mat were needled in needle-punch number of 20/cm² and used in an amount of 15% by weight based on the entire weight of the prepreg, and unidirectionally oriented glass fibrous yarns were present at a level of 25% by weight based on the entire weight of the prepreg.

EXAMPLE 3

A prepreg was prepared in a manner similar to that of Example 1, except that the prepreg contains the reinforcements of non-oriented, glass fibrous mat and unidirectionally oriented glass fibrous yarns present at a level of 15% and 25 by weight, respectively, based on the entire weight of the prepreg, and the monofilament employed in the mat and the yarn were 15 μm and 13 μm in diameter, respectively.

EXAMPLE 4

A prepreg was prepared in a manner similar to that of Example 1, except that the prepreg contains the reinforcements of non-oriented, glass fibrous mat needled in needle-punch number of 20/cm² and unidirectionally oriented glass fibrous yarns present at a level of 30% and 15% by weight, respectively, based on the entire weight of the prepreg.

Comparative Example 1

A non-oriented glass fibrous mat as a reinforcement, and unidirectionally oriented glass fibrous rovings were subjected to needle punching, to annex each other. When arranging the glass fibrous rovings, no polypropylene film was inserted. The annexed form was overlay on a polypropylene sheet which was 0.5 mm thick. Above the annexed form, there was placed a polypropylene sheet which was 2.0 mm thick. On the resulting structure, another non-oriented glass fibrous mat and another 0.5 thick polypropylene sheet were laminated, in due order, to give a laminate.

The laminate contains the non-oriented, glass fibrous mats and the glass fibrous yarns present at a level of 20% and 22% by weight, respectively, based on the entire weight of the laminate.

Using a double press belt, the laminate was pressed at 210° C. under a pressure of 30 psi, and cooled, to prepare a sheet of prepreg of thermoplastic composite resin which was 3.7 mm thick.

The physical properties of the prepreg prepared are given as shown in the following Table 1.

Comparative Example 2

A prepreg was prepared in a manner similar to that of Comparative Example 1, except that the monofilament used in the non-oriented glass fibrous mat of reinforcement and the unidirectionally oriented glass fibrous yarn were 15 μm and 13 μm in diameter, respectively.

Comparative Example 3

A prepreg was prepared in a manner similar to that of Comparative Example 1, except that the monofilament used in the non-oriented glass fibrous mat of reinforcement was 15 μm and present in an amount of 15% by weight based on the total weight of the prepreg of thermoplastic composite resin and the unidirectionally oriented glass fibrous yarn was 13 μm in diameter and present in an amount of 25% by weight based on the total weight of the prepreg of thermoplastic composite resin.

TABLE 1

| Exam. No. | Tensile Strength (kg/cm²) lengthwise | Tensile Strength (kg/cm²) crosswise | Impact Strength (kg · cm/cm) lengthwise | Impact Strength (kg · cm/cm) crosswise | Fluidity (%) | Density (g/cm³) |
|---|---|---|---|---|---|---|
| 1 | 2,000 | 680 | 140 | 105 | 220 | 1.22 |
| 2 | 2,150 | 640 | 145 | 110 | 270 | 1.23 |
| 3 | 2,200 | 650 | 155 | 90 | 200 | 1.23 |
| 4 | 1,800 | 660 | 125 | 80 | 300 | 1.23 |
| C-1 | 1,750 | 600 | 130 | 75 | 210 | 1.22 |
| C-2 | 1,850 | 610 | 135 | 80 | 210 | 1.22 |
| C-3 | 2,000 | 620 | 140 | 85 | 190 | 1.23 | note: "lengthwise" means that the strengths were measured in the same direction as the arranged direction of the glass fibrous yarn
"crosswise" means that the strengths were measured in a direction perpendicular to the arranged direction of the glass fibrous yarn.

Although the preferred embodiment of the present invention has been disclosed for illustrative purposes, those skilled in the art will appreciate that various modifications, additions and substitutions are possible, without departing from the scope and spirit of the present invention as disclosed in the accompanying claims.

What is claimed is:

1. A method for the preparation of prepreg of thermoplastic composite resin, comprising the steps of:
    laminating a first, non-oriented glass fibrous mat on a base layer of a first polypropylene film, said first non-oriented glass fibrous mat experiencing needle punching;
    forming a complex layer on the first non-oriented glass fibrous mat atop the base layer, said complex layer comprising a plurality of yarns which are unidirectionally oriented on the both sides of a second polypropylene film by winding them around the film with the tensile strength of the yarns uniform;
    overlying a second, non-oriented glass fibrous mat on the complex layer of the unidirectionally oriented glass fibrous yarn/polypropylene film/unidirectionally oriented glass fibrous yarn, said second non-oriented glass fibrous mat being needle-punched;
    covering a top layer of a third polypropylene film over the second, non-oriented glass fibrous mat, to form a laminate; and
    pressing the laminate at high temperatures under high pressures.

2. A method for the preparation of prepreg of thermoplastic composite resin, according to claim 1, wherein said polypropylene films are from about 100 to about 200 µm thick and used in an amount of about 50 to 70% by weight based on the total weight of the prepreg of thermoplastic composite resin, said non-oriented glass fibrous mats are needle-punched at a level of about 10 to about 20/cm² and employ monofilaments of glass fibers which are from about 15 to about 25 µm in diameter, said unidirectionally oriented glass fibrous yarns are from about 10 to about 30 µm in monofilament diameter and have a sizing degree of about 50 to about 100, and entire glass fibers are used in an amount of about 30 to 50% by weight based on the total weight of the thermoplastic composite resin.

3. A method for the preparation of prepreg of thermoplastic composite resin, according to claim 1, wherein said polypropylene films have melt indexes ranging from about 20 to about 40 g/10 min.

4. A method for the preparation of prepreg of thermoplastic composite resin, according to claim 2, wherein said monofilaments of glass fibers are applied with organosilane compounds to treat their surfaces.

5. A method for the preparation of prepreg of thermoplastic composite resin, according to claim 1, wherein said unidirectionally oriented glass fibrous yarns are not subjected to needle punching, alone and along with said non-oriented glass fibrous mats.

* * * * *